United States Patent
Okada et al.

(12) 
(10) Patent No.: US 6,194,501 B1
(45) Date of Patent: Feb. 27, 2001

(54) OLEFIN COPOLYMER SHRINK FILM

(75) Inventors: Keiji Okada; Kazuyuki Takimoto; Kenichi Morizono, all of Yamaguchi (JP)

(73) Assignee: Mitsui Chemicals Inc, Tokyo (JP)

( * ) Notice: Subject to any disclaimer, the term of this patent is extended or adjusted under 35 U.S.C. 154(b) by 0 days.

(21) Appl. No.: 09/155,053

(22) PCT Filed: Jan. 21, 1998

(86) PCT No.: PCT/JP98/00214

§ 371 Date: Sep. 23, 1998

§ 102(e) Date: Sep. 23, 1998

(87) PCT Pub. No.: WO98/32786

PCT Pub. Date: Jul. 30, 1998

(30) Foreign Application Priority Data

Jan. 24, 1997 (JP) .................................................. 9-011364
Dec. 8, 1997 (JP) .................................................. 9-356260

(51) Int. Cl.$^7$ ............................ B65B 53/02; C08F 210/02
(52) U.S. Cl. .......................... 524/274; 525/177; 525/210; 525/211; 525/240; 526/348.1; 526/943; 425/35.1; 425/910
(58) Field of Search ..................................... 525/240, 241, 525/210, 211, 177; 526/943, 348, 348.1, 348.2; 428/910, 34.9, 35.1; 524/270, 274

(56) References Cited

U.S. PATENT DOCUMENTS 5,658,625 * 8/1997 Bradfute et al. ..................... 428/34.9
5,977,251 * 11/1999 Kao et al. .............................. 525/53

FOREIGN PATENT DOCUMENTS 0572034A   12/1993  (EP) .
0600425A   6/1994   (EP) .
WO 9532095 11/1995  (WO) .

OTHER PUBLICATIONS

"Polyethylene", Encyclopedia of Polymer Science, vol. 6, 410–411, 1985.*
Abstract of Published International Application No. WO 95/27755 (Oct. 19, 1995).
Abstract of Published International Application No. WO 96/20150 (Jul. 4, 1996).
Abstract of Published European Application No. 0 691 354 (Jan. 10, 1996).
Abstract of Japanese Laid–Open Patent Application No. 7–316356 (Dec. 5, 1995).
Abstract of Japanese Laid–Open Patent Application No. 7–316355 (Dec. 5, 1995).
Abstract of Japanese Laid–Open Patent Application No. 1–117202 (May 10, 1989).

* cited by examiner

*Primary Examiner*—Paul Thibodeau
*Assistant Examiner*—D. Lawrence Tarazano

(57) ABSTRACT

Disclosed herein is an olefin copolymer shrink film comprising an α-olefin/aromatic vinyl compound random copolymer. This α-olefin/aromatic vinyl compound random copolymer comprises 99.9 to 58 mol % of structural units derived from ethylene, 0 to 30 mol % of structural units derived from an α-olefin having 3 to 20 carbon atoms (provided that the total of the structural units derived from ethylene and the structural units derived from an α-olefin having 3 to 20 carbon atoms ranges from 99.9 to 88 mol %), and 0.1 to 12 mol % of structural units derived from an aromatic vinyl compound. The α-olefin/aromatic vinyl compound random copolymer has an intrinsic viscosity [η], as measured in decalin at 135° C., of 0.1 to 10 dl/g and has a melting point, as measured by a differential scanning calorimeter, of 60 to 125° C. The olefin copolymer shrink film is oriented in at least one direction. The olefin copolymer shrink film has excellent low-temperature shrinkability and transparency.

11 Claims, No Drawings

OLEFIN COPOLYMER SHRINK FILM

FIELD OF THE INVENTION

The present invention relates to a polyolefin film for use in shrink wrapping. More particularly, the present invention is concerned with a film for use in shrink wrapping, which is formed from a material of specified α-olefin/aromatic vinyl compound random copolymer and which has excellent low-temperature shrinkability.

BACKGROUND OF THE INVENTION

Wrapping, in sealed fashion, industrial goods, daily needs, provisions and other items with the use of the property of shrinking, when heated, of a biaxially oriented film of thermoplastic resin, generally known as shrink wrapping, is now widely performed. For example, low density polyethylene, polypropylene, polyvinyl chloride, polyvinylidene chloride and polyesters are commonly used as materials of the above film for shrink wrapping. However, all the films prepared from these materials do not necessarily exhibit highly satisfactory performance as shrink wrapping films.

For example, a film of low density polyethylene is available at low cost and has high impact strength, so that it is suitable for industrial wrapping. However, the transparency and gloss thereof are not so good and the film has an optimum shrink temperature being 20 to 50° C. higher than that of a soft vinyl chloride film (hereinafter referred to as "PVC film"). Further, the surface hardness thereof is so low that, when goods are piled one upon another, the low density polyethylene film is likely to have flaw and the appearance of wrapped goods is likely to be deteriorated. Therefore, the low density polyethylene film is not suitable for commercial wrapping. On the other hand, the PVC film has such an excellent transparency that the beauty of wrapped goods is enhanced to thereby increase the value thereof. Further, the PVC film has an optimum shrink temperature which is low and broad. Therefore, the performance of the PVC film is one most suited for commercial wrapping. However, the PVC film cannot be used in industrial wrapping because its impact strength, especially, impact strength at low temperature is poor.

Moreover, this film involves various problems such as a problem of food hygiene attributed to a plasticizer contained in the film, a migration of the plasticizer to the wrapped goods, a tendency for film blocking and a difficulty in disposal of the film after use. Thus, substituting polyolefin films therefor is now being studied. Although the polyolefin films are characterized by having high transparency and gloss, possessing nerve and exhibiting high shrinkage stress, they have drawbacks in that their impact strength is low and their optimum shrink temperature is high and narrow. Therefore, a method of lowering the optimum shrink temperature by copolymerizing propylene with a small amount of ethylene has been proposed. However, when the ethylene content is increased, the propylene/ethylene copolymer films tend to stick to each other to thereby suffer from blocking. Further, ethylene is heterogeneously incorporated in the polymer, so that there occur problems such that the transparency of the film is deteriorated. Therefore, the ethylene content of the propylene/ethylene copolymer which can be used in shrink wrapping is generally limited to a maximum of 10 mol %. Although significantly lower than that of a polypropylene film, the optimum shrink temperature of the propylene/ethylene copolymer film with the above ethylene content is still about 20 to 50° C. higher than that of a polyethylene film.

OBJECT OF THE INVENTION

The present invention has been made in view of the above prior art and it is an object of the present invention to provide a shrink film which can suitably be used in not only commercial wrapping but also industrial wrapping. Specifically, the first object of the present invention is to provide an olefin copolymer shrink film which is excellent in low temperature heat shrinkability, has high transparency and is free from blocking problem. The second object of the present invention is to provide an olefin copolymer shrink film which is excellent in tensile strength, tear strength, impact strength and low temperature impact strength.

SUMMARY OF THE INVENTION

The olefin copolymer shrink film of the present invention comprises an α-olefin/aromatic vinyl compound random copolymer, the α-olefin/aromatic vinyl compound random copolymer comprising:

99.9 to 58 mol % of structural units derived from ethylene, 0 to 30 mol % of structural units derived from an α-olefin having 3 to 20 carbon atoms provided that the total of the structural units derived from ethylene and the structural units derived from an α-olefin having 3 to 20 carbon atoms ranges from 99.9 to 88 mol %, and 0.1 to 12 mol % of structural units derived from an aromatic vinyl compound;

the α-olefin/aromatic vinyl compound random copolymer having an intrinsic viscosity [η], as measured in decalin at 135° C., of 0.1 to 10 dl/g and having a melting point, as measured by a differential scanning calorimeter, of 60 to 125° C., the olefin copolymer shrink film being oriented in at least one direction.

In the olefin copolymer shrink film of the present invention, a tackifier may be blended in an amount of 1 to 50 parts by weight per 100 parts by weight of the α-olefin/aromatic vinyl compound random copolymer.

The olefin copolymer shrink film of the present invention is preferably oriented biaxially. This olefin copolymer shrink film preferably has a thermal shrinkage factor of at least 20% at 100° C.

DETAILED DESCRIPTION OF THE INVENTION

The olefin copolymer shrink film of the present invention will be described in detail below.

The olefin copolymer shrink film of the present invention comprises an α-olefin/aromatic vinyl compound random copolymer obtained from ethylene and an aromatic vinyl compound optionally together with an α-olefin having 3 to 20 carbon atoms. This olefin copolymer shrink film is one oriented in at least one direction.

α-Olefin/aromatic Vinyl Compound Random Copolymer

The α-olefin/aromatic vinyl compound random copolymer for use in the present invention is a random copolymer of ethylene and an aromatic vinyl compound (ethylene/aromatic vinyl compound random copolymer) or a random copolymer of ethylene, an α-olefin having 3 to 20 carbon atoms and an aromatic vinyl compound (ethylene/α-olefin/aromatic vinyl compound random copolymer).

The ethylene/aromatic vinyl compound random copolymer comprises 99.9 to 88 mol %, preferably, 99 to 90 mol % of structural units derived from ethylene and 0.1 to 12 mol %, preferably, 1 to 10 mol % of structural units derived from an aromatic vinyl compound.

Examples of suitable aromatic vinyl compounds include styrene; mono or polyalkylstyrenes such as o-methylstyrene, m-methylstyrene, p-methylstyrene, o,p-dimethylstyrene, o-ethylstyrene, m-ethylstyrene and p-ethylstyrene; functional group containing styrene derivatives such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; 3-phenylpropylene, 4-phenylbutene and α-methylstyrene. Of these, styrene and 4-methoxystyrene are preferred.

In the copolymerization of the ethylene/aromatic vinyl compound random copolymer, an α-olefin may be used in addition to the ethylene and aromatic vinyl compound. Examples of suitable α-olefins include α-olefins having 3 to 20 carbon atoms, such as propylene, 1-butene, 3-methyl-1-butene, 4-methyl-1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicodecene. Of these, 1-butene, 1-pentene, 1-hexene and 1-octene are preferred. The above α-olefins can be used either individually or in combination.

The ethylene/α-olefin/aromatic vinyl compound random copolymer comprises 99.9 to 58 mol % of structural units derived from ethylene, 0 to 30 mol % of structural units derived from an α-olefin having 3 to 20 carbon atoms (provided that the total of the structural units derived from ethylene and the structural units derived from an α-olefin having 3 to 20 carbon atoms ranges from 99.9 to 88 mol %), and 0.1 to 12 mol % of structural units derived from an aromatic vinyl compound.

It is preferred that the ethylene/α-olefin/aromatic vinyl compound random copolymer comprise 99.85 to 80 mol % of structural units derived from ethylene, 0.05 to 10 mol % of structural units derived from an α-olefin having 3 to 20 carbon atoms (provided that the total of the structural units derived from ethylene and the structural units derived from an α-olefin having 3 to 20 carbon atoms ranges from 99 to 90 mol %), and 1 to 10 mol % of structural units derived from an aromatic vinyl compound.

When the structural units derived from ethylene, the structural units derived from an α-olefin having 3 to 20 carbon atoms and the structural units derived from an aromatic vinyl compound are within the above ranges, the ethylene/α-olefin/aromatic vinyl compound random copolymer has an excellent balance of transparency, heat resistance, rigidity, low-temperature flexibility and impact resistance.

It is preferred that the total of the structural units derived from an α-olefin having 3 to 20 carbon atoms and the structural units derived from an aromatic vinyl compound range from 0.1 to 30 mol %, especially, 0.1 to 20 mol % and, still especially, 0.1 to 10 mol % from the viewpoint that the ethylene/α-olefin/aromatic vinyl compound random copolymer having an excellent balance of transparency, heat resistance, rigidity, low-temperature flexibility and impact resistance can be obtained and from the viewpoint of safety and hygiene.

In the α-olefin/aromatic vinyl compound random copolymer, another monomer, for example, a nonconjugated diene may be copolymerized. Examples of suitable nonconjugated dienes include 1,4-pentadiene, 1,4-hexadiene, 4-methyl-1,5-heptadiene, 5-methylene-2-norbornene, 5-ethylidene-2-norbornene, 5-isopropenyl-2-norbornene, 2,5-norbornadiene, 1,6-cyclooctadiene, 2-ethylene-2,5-norbornadiene, 2-isopropenyl-2,5-norbornadiene, dicyclopentadiene, 1,6-octadiene, 1,7-octadiene, tricyclopentadiene and esters of dihydrodicyclopentadienyloxyethylene with unsaturated carboxylic acids such as acrylic acid, methacrylic acid, itaconic acid, maleic acid and fumaric acid. These may be used either individually or in combination.

It is preferred that the ethylene/α-olefin/aromatic vinyl compound random copolymer have an intrinsic viscosity [η], as measured in decalin at 135° C., of 0.1 to 10 dl/g, especially, 0.5 to 8 dl/g and, still especially, 1 to 5 dl/g from the viewpoint of moldability, rigidity and impact resistance. Moreover, it is preferred that the temperature (Tm) at the position of maximum peak of the endothermic curve as measured by a differential scanning calorimeter range from 60 to 125° C., especially, 70 to 110° C. from the viewpoint that a film having an excellent balance of rigidity, toughness, transparency, heat resistance, etc. can be obtained.

In the α-olefin/aromatic vinyl compound random copolymer for use in the present invention, it is preferred that the ratio of structural units constituting a chain structure in which at least two structural units derived from an aromatic vinyl compound are arranged in sequence be 1% or less, especially, 0.1% or less based on the structural units derived from the aromatic vinyl compound. The content of the chain structure in which at least two structural units derived from an aromatic vinyl compound are arranged in sequence can be determined by $^{13}$C-NMR.

A process for producing the α-olefin/aromatic vinyl compound random copolymer will now be described.

The α-olefin/aromatic vinyl compound random copolymer for use in the present invention can be produced by copolymerizing ethylene and an aromatic vinyl compound optionally together with an α-olefin having 3 to 20 carbon atoms, for example, in the presence of a metallocene catalyst (a).

Any of metallocene catalysts having been commonly used as a single site catalyst and metallocene catalyst similar thereto can be used as the above metallocene catalyst (a) without any restriction. In particular, a catalyst composed of a metallocene compound of transition metal (transition metal compound) (b), an organoaluminum oxy compound (c) and/or an ionizing ionic compound (d) is preferably used.

Examples of suitable metallocene compounds (b) include metallocene compounds of transition metals selected from among the elements of Group 4 of the periodic table (long period type) as indicated by group numbers 1 to 18 of revised issue (1989) of the IUPAC Inorganic Chemistry Nomenclature, in particular, metallocene compounds represented by the following general formula (1).

$$ML_x \qquad (1)$$

In the formula (1), M is a transition metal selected from elements of Group 4 of the periodic table, e.g., zirconium, titanium or hafnium, and x is a valence of the transition metal.

L is a ligand coordinated to the transition metal. At least one ligand L is a ligand having a cyclopentadienyl skeleton which may have a substituent.

Examples of the ligands having a cyclopentadienyl skeleton include alkyl or cycloalkyl substituted cyclopentadienyl groups, such as cyclopentadienyl, methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl.

Further, an indenyl group, a 4,5,6,7-tetrahydroindenyl group and a fluorenyl group can be also mentioned.

Those groups may be substituted with halogen atoms or trialkylsilyl groups.

Of the above ligands, particularly preferred are alkyl substituted cyclopentadienyl groups.

When the metallocene compound (b) represented by the formula (1) has two or more ligands L having a cyclopentadienyl skeleton, two of the ligands having a cyclopentadienyl skeleton may be bonded to each other through an alkylene group such as ethylene or propylene, a substituted alkylene group such as isopropylidene and diphenylmethylene, a silylene group, or a substituted silylene group such as dimethylsilylene, diphenylsilylene or methylphenylsilylene.

Examples of L other than the ligand having a cyclopentadienyl skeleton include a hydrocarbon group of 1 to 12 carbon atoms, an alkoxyl group, an aryloxy group, a sulfonic acid-containing group ($-SO_3R^1$), a halogen atom or hydrogen atom, where $R^1$ is an alkyl group, an alkyl group substituted with a halogen atom, an aryl group, or an aryl group substituted with a halogen atom or an alkyl group.

Examples of the hydrocarbon groups of 1 to 12 carbon atoms include alkyl groups, cycloalkyl groups, aryl groups and aralkyl groups, more specifically, there can be mentioned:

alkyl groups, such as methyl, ethyl, n-propyl, isopropyl, n-butyl, isobutyl, sec-butyl, t-butyl, pentyl, hexyl, octyl, decyl and dodecyl;

cycloalkyl groups, such as cyclopentyl and cyclohexyl;

aryl groups, such as phenyl and tolyl; and aralkyl group, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

The aryloxy group is, for example, phenoxy.

Examples of the sulfonic acid-containing group ($-SO_3R^1$) include methanesulfonato, p-toluenesulfonato, trifluoromethansulfonate and p-chlorobenzenesulfonato.

Examples of the halogen atoms include fluorine, chlorine, bromine and iodine.

The metallocene compound (b) of the above formula (1) wherein the valence of the transition metal is 4 is more specifically represented by the following formula (2):

$$R^2{}_k R^3{}_l R^4{}_m R^5{}_n M \quad (2)$$

wherein M is the above-mentioned transition metal of the formula (1), and preferably be zirconium and hafnium, $R^2$ is a group (ligand) having a cyclopentadienyl skeleton, $R^3$, $R^4$ and $R^5$ are each independently a group having a cyclopentadienyl skeleton or the same as L other than the ligand having a cyclopentadienyl skeleton in the above formula (1), k is an integer of not less than 1, and k+l+m+n=4.

Further, a bridge type metallocene compound of the following formula (A) is also employable.

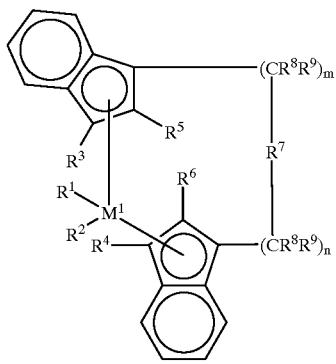

(A)

In the formula (A), $M^1$ is a metal of Group 4 of the periodic table, e.g., titanium, zirconium or hafnium.

$R^1$ and $R^2$ may be the same or different, and are each hydrogen, an alkyl group of 1 to 10, preferably 1 to 3 carbon atoms, an alkoxy group of 1 to 10, preferably 1 to 3 carbon atoms, an aryl group of 6 to 10, preferably 6 to 8 carbon atoms, an aryloxy group of 6 to 10, preferably 6 to 8 carbon atoms, an alkenyl group of 2 to 10, preferably 2 to 4 carbon atoms, an arylalkyl group of 7 to 40, preferably 7 to 10 carbon atoms, an alkylaryl group of 7 to 40, preferably 7 to 12 carbon atoms, an arylalkenyl group of 8 to 40, preferably 8 to 12 carbon atoms, or a halogen atom, preferably chlorine.

$R^3$ and $R^4$ may be the same or different, and are each hydrogen, a halogen atom, preferably fluorine, chlorine or bromine, an alkyl group of 1 to 10, preferably 1 to 4 carbon atoms which may be halogenated, an aryl group of 6 to 10, preferably 6 to 8 carbon atoms, or a group of $-NR^{10}{}_2$, $-SR^{10}$, $-OSiR^{10}{}_3$, $-SiR^{10}{}_3$ or $-PR^{10}{}_2$, where $R^{10}$ is a halogen atom, preferably chlorine, an alkyl group of 1 to 10, preferably 1 to 3 carbon atoms, or an aryl group of 6 to 10, preferably 6 to 8 carbon atoms.

$R^3$ and $R^4$ are each particularly preferably hydrogen.

$R^5$ and $R^6$ may be the same or different, preferably the same, and have the same meanings as described for $R^3$ and $R^4$ with the proviso that each of $R^5$ and $R^6$ is not hydrogen. $R^5$ and $R^6$ are each preferably an alkyl group of 1 to 4 carbon atoms which may be halogenated, for example, methyl, ethyl, propyl, isopropyl, butyl, isobutyl or trifluoromethyl, preferably methyl.

$R^7$ is

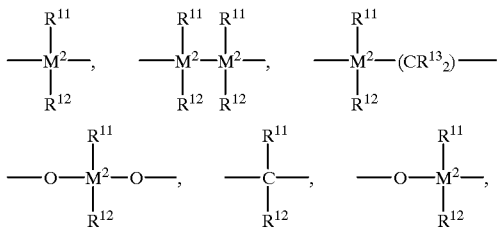

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$, where $R^{11}$, $R^{12}$ and $R^{13}$ may be the same or different, and are each hydrogen, a halogen atom, an alkyl group of 1 to 10, preferably 1 to 4 carbon atoms, more preferably methyl, a fluoroalkyl group of 1 to 10 carbon atoms, preferably $CF_3$, an aryl group of 6 to 10, preferably 6 to 8 carbon atoms, a fluoroaryl group of 6 to 10 carbon atoms, preferably pentafluorophenyl, an alkoxy group of 1 to 10, preferably 1 to 4 carbon atoms, particularly preferably methoxy, an alkenyl group of 2 to 10, preferably 2 to 4 carbon atoms, an arylalkyl group of 7 to 40, preferably 7 to 10 carbon atoms, an arylalkenyl group of 8 to 40, preferably 8 to 12 carbon atoms, or an alkylaryl group of 7 to 40, preferably 7 to 12 carbon atoms, or $R^{11}$ and $R^{12}$, or $R^{11}$ and $R^{13}$ may form together with the atoms to which they are bonded a ring.

$M^2$ is silicon, germanium or tin, preferably silicon or germanium.

$R^7$ is preferably $=CR^{11}R^{12}$, $=SiR^{11}R^{12}$, $=GeR^{11}R^{12}$, —O—, —S—, =SO, $=PR^{11}$ or $=P(O)R^{11}$.

$R^8$ and $R^9$ may be the same or different, and have the same meaning as described for $R^{11}$.

m and n may be the same or different, and are each 0, 1 or 2, preferably 0 or 1, and m+n is 0, 1 or 2, preferably 0 or 1.

Particularly preferred metallocene compounds satisfying the above conditions are compounds represented by the following formulas (i) to (iii).

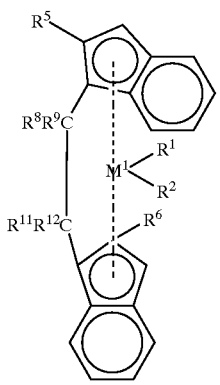

(i)

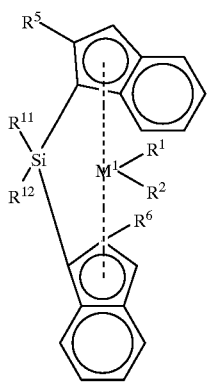

(ii)

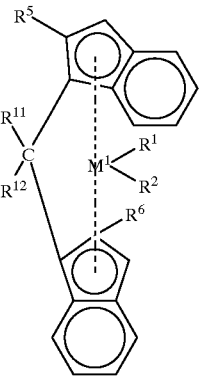

(iii)

In the above formulas (i), (ii) and (iii), $M^1$ is Zr or Hf, $R^1$ and $R^2$ are each methyl or chlorine, $R^5$ and $R^6$ are each methyl, ethyl or trifluoromethyl, and $R^8$, $R^9$, $R^{10}$ and $R^{12}$ have the same meanings as described above.

Of the compounds represented by the formulas (i), (ii) and (iii), particularly preferred are the following compounds:

rac-dimethylmethylenebis(indenyl)zirconium dichloride,
rac-dimethylmethylenebis(2-methyl-1-indenyl)zirconium dichloride,
rac-diphenylmethylenebis(2-methyl-1-indenyl)zirconium dichloride,
rac-ethylenebis(2-methyl-1-indenyl)zirconium dichloride,
rac-dimethylsilylenebis(2-methyl-1-indenyl)zirconium dichloride,
rac-dimethylsilylenebis(2-methyl-1-indenyl)zirconium dimethyl,
rac-ethylenebis(2-methyl-1-indenyl)zirconium dimethyl,
rac-phenyl(methyl)silylenebis(2-methyl-1-indenyl) zirconium dichloride,
rac-diphenylsilylenebis(2-methyl-1-indenyl)zirconium dichloride,
rac-methylethylenebis(2-methyl-1-indenyl)zirconium dichloride, and
rac-dimethylsilylenebis(2-ethyl-1-indenyl)zirconium dichloride.

These metallocene compounds can be prepared by conventionally known processes (see, for example, Japanese Patent Laid-Open Publication No. 268307/1992).

In the present invention, as a bridge type metallocene compound, a transition metal compound (metallocene compound) represented by the following formula (B) is also employable.

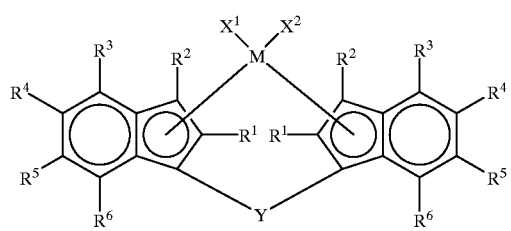

(B)

In the formula (B), M is a transition metal atom of Group 4 of the periodic table, specifically, titanium, zirconium or hafnium.

$R^1$ and $R^2$ are each independently hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include the above-exemplified hydrocarbon groups which are substituted with halogen atoms.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsililphenyl.

Examples of the oxygen-containing groups include hydroxy groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those wherein oxygen is replaced with sulfur in the above-exemplified oxygen-containing group.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably a hydrocarbon group, particularly preferably a hydrocarbon group of 1 to 3 carbon atoms (methyl, ethyl or propyl). $R^2$ is preferably hydrogen or a hydrocarbon group, particularly preferably hydrogen or a hydrocarbon group of 1 to 3 carbon atoms (methyl, ethyl or propyl).

$R^3$, $R^4$, $R^5$ and $R^6$ are each independently hydrogen, a halogen atom, a hydrocarbon group of 1 to 20 carbon atoms or a halogenated hydrocarbon group of 1 to 20 carbon atoms. Of these, preferred is hydrogen, the hydrocarbon group or the halogenated hydrocarbon group. At least one combination of $R^3$ and $R^4$, $R^4$ and $R^5$, or $R^5$ and $R^6$ may form together with the carbon atoms to which they are bonded a monocyclic aromatic ring.

When there are two or more hydrocarbon groups or halogenated hydrocarbon groups, excluding the groups for forming the aromatic ring, they may be bonded to each other to form a ring. When $R^6$ is a substituent other than the aromatic group, it is preferably hydrogen.

Examples of the halogen atoms, the hydrocarbon groups of 1 to 20 carbon atoms and the halogenated hydrocarbon groups of 1 to 20 carbon atoms are those described for $R^1$ and $R^2$.

As the ligand which contains a monocyclic aromatic ring formed by at least one combination of $R^3$ and $R^4$, $R^4$ and $R^5$, or $R^5$ and $R^6$, as mentioned above, and is coordinated to M, there can be mentioned the following ones.

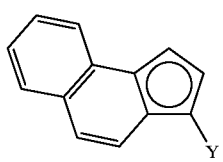

(1)

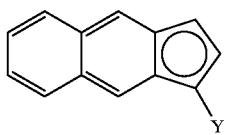

(2)

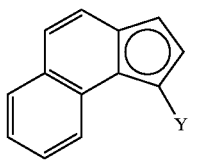

(3)

Of these, preferred is the ligand represented by the formula (1).

The aromatic ring mentioned above may be substituted with a halogen atom, a hydrocarbon group of 1 to 20 carbon atoms or a halogenated hydrocarbon group of 1 to 20 carbon atoms.

Examples of the halogen atoms, the hydrocarbon groups of 1 to 20 carbon atoms and the halogenated hydrocarbon groups of 1 to 20 carbon atoms for substituting the aromatic ring are those described for $R^1$ and $R^2$.

$X^1$ and $X^2$ are each independently hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms, the hydrocarbon groups of 1 to 20 carbon atoms, the halogenated hydrocarbon groups of 1 to 20 carbon atoms and the oxygen-containing groups are those described for $R^1$ and $R^2$.

Examples of the sulfur-containing groups include those described for $R^1$ and $R^2$; and further sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O)(R$^7$)—, —BR$^7$— or —AlR$^7$—, where R$^7$ is hydrogen, a halogen atom, a hydrocarbon group of 1 to 20 carbon atoms or a halogenated hydrocarbon group of 1 to 20 carbon atoms.

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene.

Examples of the divalent halogenated hydrocarbon groups include the above-mentioned divalent hydrocarbon groups of 1 to 20 carbon atoms, which are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl) silylene, di(cyclohexyl)silylene, methylphenylsilylene, diphenylsilylene, di(p-tolyl)silylene and di(p-chlorophenyl) silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-mentioned divalent silicon-containing groups.

Examples of the divalent tin-containing groups include those wherein silicon is replaced with tin in the above-mentioned divalent silicon-containing groups.

R$^7$ is a halogen atom, a hydrocarbon group of 1 to 20 carbon atoms or a halogenated hydrocarbon group of 1 to 20 carbon atoms, examples of which are those described for R$^1$ and R$^2$.

Of the above groups, preferred are divalent silicon-containing groups, divalent germanium-containing groups and divalent tin-containing group, and more preferred are divalent silicon-containing groups. Of these, particularly preferred are alkylsilylene, alkylarylsilylene and arylsilylene.

Listed below are examples of the transition metal compounds represented by the formula (B).

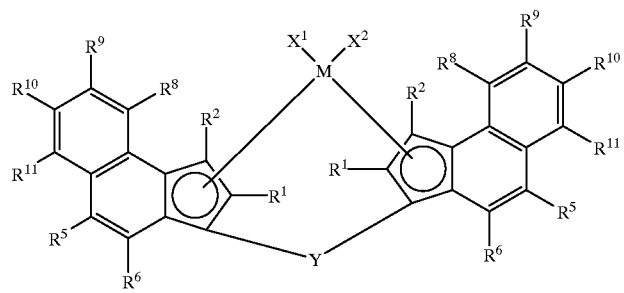

| R$^1$ | R$^2$ | R$^5$ | R$^6$ | R$^8$ | R$^9$ | R$^{10}$ | R$^{11}$ | Y | X$^1$ | X$^2$ | M |
|---|---|---|---|---|---|---|---|---|---|---|---|
| H | H | H | H | H | H | H | H | SiMe$_2$ | Cl | Cl | Zr |
| CH$_3$ | H | H | H | H | H | H | H | SiMe$_2$ | Cl | Cl | Zr |
| CH$_3$ | H | H | H | H | H | H | H | SiMePh | Cl | Cl | Zr |
| CH$_3$ | H | H | H | H | H | H | H | SiPh$_2$ | Cl | Cl | Zr |
| CH$_3$ | H | H | H | H | H | H | H | Si(p-tolyl)$_2$ | Cl | Cl | Zr |
| CH$_3$ | H | H | H | H | H | H | H | Si(pClPh)$_2$ | Cl | Cl | Zr |
| CH$_3$ | H | H | H | H | H | H | H | C$_2$H$_5$ | Cl | Cl | Zr |
| CH$_3$ | H | H | H | H | H | H | H | GeMe$_2$ | Cl | Cl | Zr |
| CH$_3$ | H | H | H | H | H | H | H | SnMe$_2$ | Cl | Cl | Zr |
| CH$_3$ | H | H | H | H | H | H | H | SiMe$_2$ | Br | Br | Zr |
| CH$_3$ | H | H | H | H | H | H | H | SiMe$_2$ | Cl | OSO$_2$CH$_3$ | Zr |
| CH$_3$ | H | H | H | H | H | H | H | SiMe$_2$ | Cl | SO$_2$CH$_3$ | Zr |
| CH$_3$ | H | H | H | H | H | H | H | SiMe$_2$ | Cl | Cl | Ti |
| CH$_3$ | H | H | H | H | H | H | H | SiMe$_2$ | Cl | Cl | Hf |
| C$_2$H$_5$ | H | H | H | H | H | H | H | SiMe$_2$ | Cl | Cl | Zr |
| nC$_3$H$_7$ | H | H | H | H | H | H | H | SiMe$_2$ | Cl | Cl | Zr |
| Ph | H | H | H | H | H | H | H | SiMe$_2$ | Cl | Cl | Zr |
| CH$_3$ | CH$_3$ | H | H | H | H | H | H | SiMe$_2$ | Cl | Cl | Zr |
| CH$_3$ | CH$_3$ | H | H | H | H | H | H | SiPh$_2$ | Cl | Cl | Zr |
| CH$_3$ | CH$_3$ | CH$_3$ | H | H | H | H | H | SiMe$_2$ | Cl | Cl | Zr |
| CH$_3$ | H | Cl | H | H | H | H | H | SiMe$_2$ | Cl | Cl | Zr |
| CH$_3$ | H | CH$_3$ | H | H | H | H | H | SiMe$_2$ | Cl | Cl | Zr |
| CH$_3$ | H | C$_2$H$_5$ | H | H | H | H | H | SiMe$_2$ | Cl | Cl | Zr |
| CH$_3$ | H | Ph | H | H | H | H | H | SiMe$_2$ | Cl | Cl | Zr |
| CH$_3$ | H | H | CH$_3$ | H | H | H | H | SiMe$_2$ | Cl | Cl | Zr |
| CH$_3$ | H | CH$_3$ | CH$_3$ | H | H | H | H | SiMe$_2$ | Cl | Cl | Zr |
| CH$_3$ | H | CH$_2$*$^1$ | CH$_3$ | H | H | H | CH$_2$*$^1$ | SiMe$_2$ | Cl | Cl | Zr |
| CH$_3$ | H | H | H | H | H | H | Ph | SiMe$_2$ | Cl | Cl | Zr |

*$^1$R$^5$ and R$^{11}$ are bonded to each other to form a five-membered ring.
Me: methyl;
Et: ethyl;
Ph: phenyl.

-continued

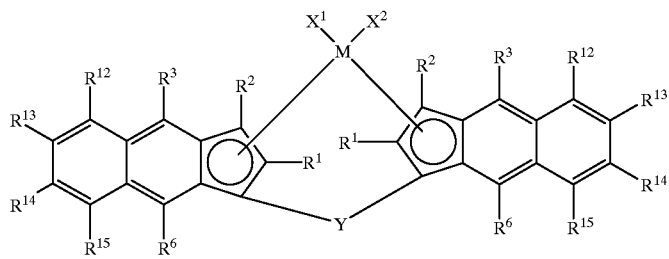

| R¹ | R² | R³ | R⁶ | R¹² | R¹³ | R¹⁴ | R¹⁵ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiPh₂ | Cl | Cl | Zr |
| CH₃ | CH₃ | H | H | H | H | H | H | SiMe₂ | Cl | Cl | Zr |
| CH₃ | H | CH₃ | H | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*² | CH₂*² | CH₂*² | H | H | CH₂*² | SiMe₂ | Cl | Cl | Zr |
| CH₃ | H | CH₃ | CH₃ | CH₃ | H | H | CH₃ | SiMe₂ | Cl | Cl | Zr |

*²R³ and R¹², and R⁶ and R¹⁵ are bonded to each other to form a five-memebered ring, respectively.
Me: methyl;
Ph: phenyl

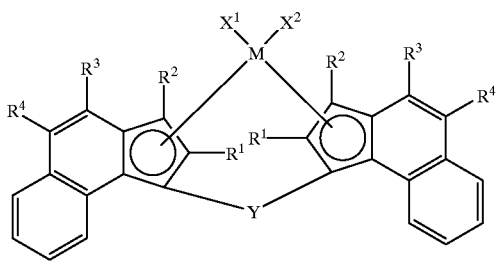

| R¹ | R² | R³ | R⁴ | Y | X¹ | X² | M |
|---|---|---|---|---|---|---|---|
| H | H | H | H | SiMe₂ | Cl | Cl | Zr |
| H | CH₃ | H | H | SiMe₂ | Cl | Cl | Zr |
| H | CH₃ | H | CH₃ | SiMe₂ | Cl | Cl | Zr |
| H | CH₃ | CH₃ | CH₃ | SiMe₂ | Cl | Cl | Zr |
| CH₃ | CH₃ | H | H | SiMe₂ | Cl | Cl | Zr |
| CH₃ | CH₃ | H | CH₃ | SiMe₂ | Cl | Cl | Zr |
| CH₃ | CH₃ | CH₃ | CH₃ | SiMe₂ | Cl | Cl | Zr |

Me: methyl.

Also employable in the invention are transition metal compounds wherein zirconium is replaced with titanium or hafnium in the above-mentioned compounds.

The transition metal compounds mentioned above are used generally in the form of racemic modification as the olefin polymerization catalyst component, but they can be used also in the form of R type or S type.

The indene derivative ligands for the transition metal compounds can be synthesized in accordance with ordinary organic synthesis through, for example, the reaction route described below.

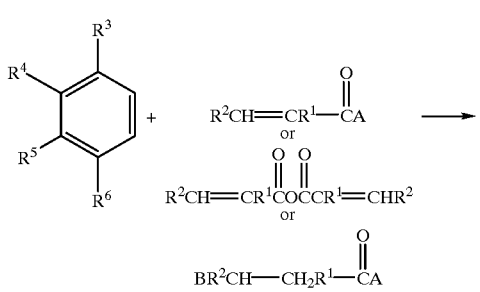

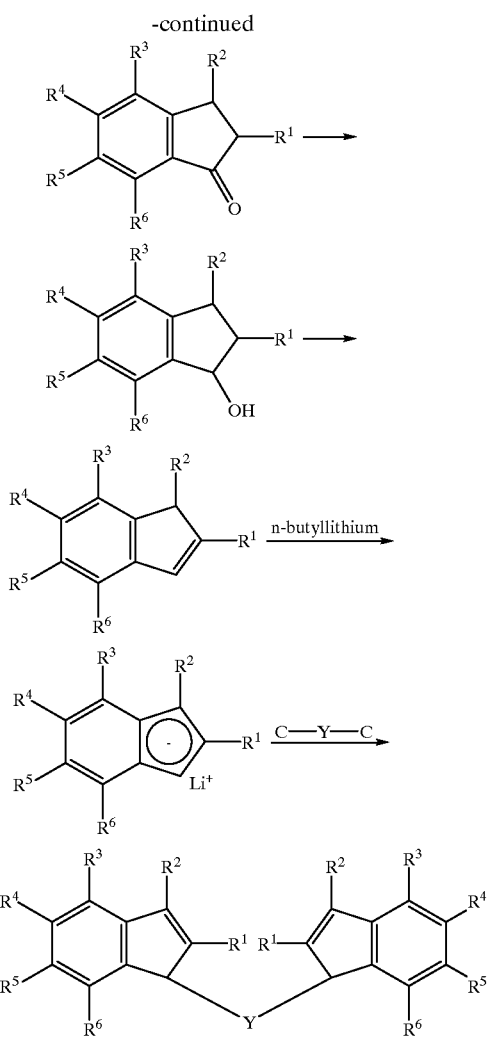

wherein A, B, C are each halogen.

The transition metal compounds used in the invention can be synthesized from these indene derivatives in accordance with conventionally known processes, for example, described in Japanese Patent Laid-Open Publication No. 268307/1992.

In the present invention, as another bridge type metallocene compound, a transition metal compound (metallocene compound) represented by the following formula (C) is also employable.

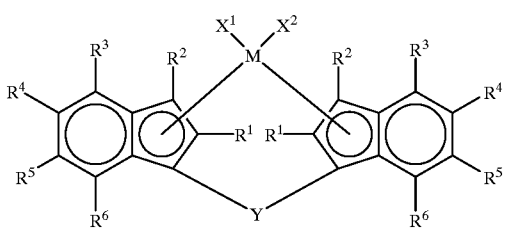

(C)

In the formula (C), M, $R^1$, $R^2$, $R^3$, $R^4$, $R^5$ and $R^6$ have the same meanings described for those in the aforesaid formula (B).

Of $R^3$, $R^4$, $R^5$ and $R^6$, at least two groups including $R^3$ are preferably alkyl groups, and it is more preferred that $R^3$ and $R^5$, or $R^3$ and $R^6$ are alkyl groups. These alkyl groups are preferably secondary or tertiary alkyl groups, and may be substituted with halogen atoms or silicon-containing groups. As the halogen atoms and the silicon-containing groups, there can be mentioned those substituents as described for $R^1$ and $R^2$.

Of the groups $R^3$, $R^4$, $R^5$ and $R^6$, other groups than the alkyl groups are each preferably hydrogen.

Examples of the hydrocarbon groups of 1 to 20 carbon atoms include straight chain and branched chain alkyl groups and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl; and arylalkyl groups, such as benzyl, phenylethyl, phenylpropyl and tolylmethyl. These groups may contain a double bond or a triple bond.

Two groups selected from $R^3$, $R^4$, $R^5$ and $R^6$ may be bonded to each other to form a monocyclic or polycyclic hydrocarbon ring other than the aromatic ring.

Examples of the halogen atoms are those described for $R^1$ and $R^2$.

$X^1$, $X^2$, Y and $R^7$ have the same meanings described for those in the aforesaid formula (B).

Listed below are examples of the metallocene compounds (transition metal compounds) represented by the formula (C).

rac-Dimethylsilylene-bis(4,7-dimethyl-1-indenyl) zirconium dichloride, rac-Dimethylsilylene-bis(2,4,7-trimethyl-1-indenyl) zirconium dichloride, rac-Dimethylsilylene-bis(2,4,6-trimethyl-1-indenyl) zirconium dichloride, rac-Dimethylsilylene-bis(2,5,6-trimethyl-1-indenyl) zirconium dichloride, rac-Dimethylsilylene-bis(2,4,5,6-tetramethyl-1-indenyl) zirconium dichloride, rac-Dimethylsilylene-bis(2,4,5,6,7-pentamethyl-1-indenyl)zirconium dichloride, rac-Dimethylsilylene-bis(2-methyl-4-n-propyl-7-methyl-1-indenyl)zirconium dichloride, rac-Dimethylsilylene-bis(4-i-propyl-7-methyl-1-indenyl) zirconium dichloride, rac-Dimethylsilylene-bis(2-methyl-4-i-propyl-7-methyl-1-indenyl)zirconium dichloride, rac-Dimethylsilylene-bis(2-methyl-4-i-propyl-6-methyl-1-indenyl)zirconium dichloride, rac-Dimethylsilylene-bis(2-methyl-4-methyl-6-i-propyl-1-indenyl)zirconium dichloride, rac-Dimethylsilylene-bis(2-methyl-4-i-propyl-5-methyl-1-indenyl)zirconium dichloride, rac-Dimethylsilylene-bis(2-methyl-4,6-di(i-propyl)-1-indenyl)zirconium dichloride, rac-Dimethylsilylene-bis(2-methyl-4,6-di(i-propyl)-7-methyl-1-indenyl)zirconium dichloride, rac-Dimethylsilylene-bis(2-methyl-4-i-butyl-7-methyl-1-indenyl)zirconium dichloride, rac-Dimethylsilylene-bis(2-methyl-4-sec-butyl-7-methyl-1-indenyl)zirconium dichloride, rac-Dimethylsilylene-bis(2-methyl-4,6-di(sec-butyl)-1-indenyl)zirconium dichloride, rac-Dimethylsilylene-bis(2-methyl-4-tert-butyl-7-methyl-1-indenyl)zirconium dichloride, rac-Dimethylsilylene-bis(2-methyl-4-cyclohexyl-7-methyl-1-indenyl)zirconium dichloride, rac-Dimethylsilylene-bis(2-methyl-4-benzyl-7-methyl-1-indenyl)zirconium dichloride,
rac-Dimethylsilylene-bis(2-methyl-4-phenylethyl-7-methyl-1-indenyl)zirconium dichloride,
rac-Dimethylsilylene-bis(2-methyl-4-phenyldichloromethyl-7-methyl-1-indenyl)zirconium dichloride,
rac-Dimethylsilylene-bis(2-methyl-4-chloromethyl-7-methyl-1-indenyl)zirconium dichloride,
rac-Dimethylsilylene-bis(2-methyl-4-trimethylsilylmethyl-7-methyl-1-indenyl)zirconium dichloride,
rac-Dimethylsilylene-bis(2-methyl-4-trimethylsiloxymethyl-7-methyl-1-indenyl)zirconium dichloride,
rac-Diethylsilylene-bis(2-methyl-4-i-propyl-7-methyl-1-indenyl)zirconium dichloride,
rac-Di(i-propyl)silylene-bis(2-methyl-4-i-propyl-7-methyl-1-indenyl)zirconium dichloride,
rac-Di(n-butyl)silylene-bis(2-methyl-4-i-propyl-7-methyl-1-indenyl) zirconium dichloride,
rac-Di (cyclohexyl) silylene-bis (2-methyl-4-i-propyl-7-methyl-1-indenyl)zirconium dichloride,
rac-Methylphenylsilylene-bis(2-methyl-4-i-propyl-7-methyl-1-indenyl)zirconium dichloride,
rac-Diphenylsilylene-bis(2-methyl-4-i-propyl-7-methyl-1- indenyl)zirconium dichloride,
rac-Diphenylsilylene-bis(2-methyl-4-di(i-propyl)-1-indenyl)zirconium dichloride,
rac-Di(p-tolyl)silylene-bis(2-methyl-4-i-propyl-7-methyl-1-indenyl)zirconium dichloride,
rac-Di(p-chlorophenyl)silylene-bis(2-methyl -4-i-propyl-7-methyl-1-indenyl)zirconium dichloride,
rac-Dimethylsilylene-bis(2-methyl-4-i-propyl-7-methyl-1-indenyl)zirconium dibromide,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride,
rac-Dimethylsilylene-bis(2-methyl-4-i-propyl-7-methyl-1-indenyl)zirconium-bis(methanesulfonato),
rac-Dimethylsilylene-bis(2-methyl-4-i-propyl-7-methyl-1-indenyl)zirconium-bis(p-phenylsulfinato),
rac-Dimethylsilylene-bis(2-methyl-3-methyl-4-i-propyl-6-methyl-1-indenyl)zirconium dichloride,
rac-Dimethylsilylene-bis(2-ethyl-4-i-propyl-6-methyl-1-indenyl)zirconium dichloride, and
rac-Dimethylsilylene-bis(2-phenyl-4-i-propyl-6-methyl--1-indenyl)zirconium dichloride.

Also employable in the invention are transition metal compounds wherein zirconium is replaced with titanium metal or hafnium metal in the above-mentioned compounds.

The transition metal compounds mentioned above are used generally in the form of racemic modification, but they can be used also in the form of R type or S type.

The indene derivative ligands for the transition metal compounds can be synthesized in accordance with ordinary organic synthesis through, for example, the aforementioned reaction route.

The transition metal compounds (metallocene compounds) represented by the formula (C) can be synthesized from these indene derivatives in accordance with conventionally known processes, for example, described in Japanese Patent Laid-Open Publication No. 268307/1992.

In the present invention, as a further bridge type metallocene compound, a transition metal compound (metallocene compound) represented by the following formula (D) is also employable.

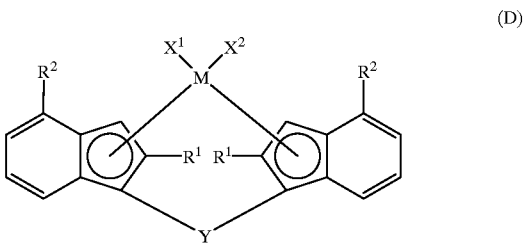

In the formula (D), M, $R^1$, $X^1$, $X^2$ and Y have the same meanings as described for those in the aforesaid formula (B) or (C).

$R^1$ is preferably a hydrocarbon group, more preferably a hydrocarbon group of 1 to 4 carbon atoms, e.g., methyl, ethyl, propyl and butyl.

$X^1$ and $X^2$ are each preferably a halogen atom or a hydrocarbon group of 1 to 20 carbon atoms.

$R^2$ is an aryl group of 6 to 16 carbon atoms, for example, phenyl, α-naphthyl, β-naphthyl, anthracenyl, phenanthryl, pyrenyl, acenaphthyl, phenalenyl (perinaphthenyl) or aceanthrylenyl. Of these, phenyl or naphthyl is preferred. These aryl groups may be substituted with halogen atoms, hydrocarbon groups of 1 to 20 carbon atoms or halogenated hydrocarbon groups of 1 to 20 carbon atoms such as described for $R^1$.

Listed below are examples of the transition metal compounds (metallocene compounds) represented by the formula (D).

rac-Dimethylsilylene-bis(4-phenyl-1-indenyl)zirconium dichloride,
rac-Dimethylsilylene-bis(2-methyl-4-phenyl-1-indenyl) zirconium dichloride,
rac-Dimethylsilylene-bis(2-methyl-4-(a-naphthyl)-1-indenyl)zirconium dichloride,
rac-Dimethylsilylene-bis(2-methyl-4-(P-naphthyl)-1-indenyl)zirconium dichloride,
rac-Dimethylsilylene-bis(2-methyl-4-(1-anthracenyl)-1-indenyl) zirconium dichloride,
rac-Dimethylsilylene-bis (2-methyl-4- (2-anthracenyl) -1-indenyl)zirconium dichloride,
rac-Dimethylsilylene-bis(2-methyl-4-(9-anthracenyl)-1-indenyl)zirconium dichloride,
rac-Dimethylsilylene-bis(2-methyl-4-(9-phenanthryl)-1-indenyl)zirconium dichloride,
rac-Dimethylsilylene-bis(2-methyl-4-(p-fluorophenyl)-1-indenyl)zirconium dichloride,
rac-Dimethylsilylene-bis(2-methyl-4-(pentafluorophenyl)1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(m-chlorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(o,p-dichlorophenyl)phenyl-1-indenyl)zirconium dichloride,
rac-Dimethylsilylene-bis(2-methyl-4-(p-bromophenyl)-1-indenyl)zirconium dichloride, rac-Dimethylsilylene-bis(2-methyl-4-(p-tolyl)-1-indenyl) zirconium dichloride,
rac-Dimethylsilylene-bis(2-methyl-4-(m-tolyl)-1-indenyl)zirconium dichloride,
rac-Dimethylsilylene-bis(2-methyl-4-(o-tolyl)-1-indenyl) zirconium dichloride,
rac-Dimethylsilylene-bis(2-methyl-4-(o,o'-dimethylphenyl)-1-indenyl)zirconium dichloride,
rac-Dimethylsilylene-bis(2-methyl-4-(p-ethylphenyl)-1-indenyl)zirconium dichloride,
rac-Dimethylsilylene-bis(2-methyl-4-(p-i-propylphenyl)-1-indenyl)zirconium dichloride,
rac-Dimethylsilylene-bis(2-methyl-4-(p-benzylphenyl)-1-indenyl)zirconium dichloride,
rac-Dimethylsilylene-bis(2-methyl-4-(p-biphenyl)-1-indenyl)zirconium dichloride,
rac-Dimethylsilylene-bis(2-methyl-4-(m-biphenyl)-1-indenyl)zirconium dichloride,
rac-Dimethylsilylene-bis(2-methyl-4-(p-trimethylsilylphenyl)-1-indenyl)zirconium dichloride,
rac-Dimethylsilylene-bis(2-methyl-4-(m-trimethylsilylphenyl)-1-indenyl)zirconium dichloride,
rac-Dimethylsilylene-bis(2-ethyl-4-phenyl-1-indenyl) zirconium dichloride,
rac-Diphenylsilylene-bis(2-ethyl-4-phenyl-1-indenyl) zirconium dichloride,
rac-Dimethylsilylene-bis(2-phenyl-4-phenyl-1-indenyl) zirconium dichloride,
rac-Dimethylsilylene-bis(2-n-propyl-4-phenyl-1-indenyl) zirconium dichloride,
rac-Diethylsilylene-bis(2-methyl-4-phenyl-1-indenyl) zirconium dichloride,
rac-Di-(i-propyl)silylene-bis(2-methyl-4-phenyl-1-indenyl)zirconium dichloride,
rac-Di-(n-butyl)silylene-bis(2-methyl-4-phenyl-1-indenyl)zirconium dichloride,
rac-Dicyclohexylsilylene-bis(2-methyl-4-phenyl-1-indenyl)zirconium dichloride,
rac-Methylphenylsilylene-bis(2-methyl-4-phenyl-1-indenyl)zirconium dichloride,
rac-Diphenylsilylene-bis(2-methyl-4-phenyl-1-indenyl) zirconium dichloride,
rac-Di(p-tolyl)silylene-bis(2-methyl-4-phenyl-1-indenyl)zirconium dichloride,
rac-Di(p-chlorophenyl)silylene-bis(2-methyl-4-phenyl-1-indenyl)zirconium dichloride,
rac-Methylene-bis(2-methyl-4-phenyl-1-indenyl) zirconium dichloride,
rac-Ethylene-bis(2-methyl-4-phenyl-1-indenyl)zirconium dichloride,
rac-Dimethylgermylene-bis (2-methyl-4-phenyl-1-indenyl)zirconium dichloride,
rac-Dimethylstannylene-bis(2-methyl-4-phenyl-1-indenyl)zirconium dichloride,
rac-Dimethylsilylene-bis(2-methyl-4-phenyl-1-indenyl) zirconium dibromide,
rac-Dimethylsilylene-bis(2-methyl-4-phenyl-1-indenyl) zirconium dimethyl,
rac-Dimethylsilylene-bis(2-methyl-4-phenyl-1-indenyl) zirconium methylchloride,
rac-Dimethylsilylene-bis(2-methyl-4-phenyl-1-indenyl) zirconium chloride $SO_2Me$, and
rac-Dimethylsilylene-bis(2-methyl-4-phenyl-1-indenyl) zirconium chloride $OSO_2Me$.

Also employable in the invention are transition metal compounds wherein zirconium is replaced with titanium metal or hafnium metal in the above-mentioned compounds.

The transition metal compounds represented by the formula (D) can be prepared in accordance with "Journal of Organometallic Chem.", 288(1985), pp. 63–67, and European Patent Publication No. 0,320,762 (specification and examples), for example, in the following manner.

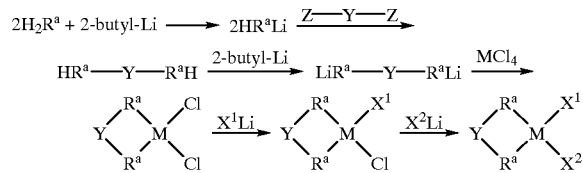

wherein Z is Cl, Br, I or o-tosyl, and $H_2R^a$ is

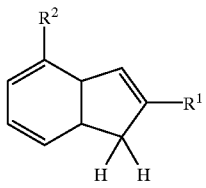

The transition metal compounds (D) are used generally in the form of racemic modification, but they can be used also in the form of R type or S type.

In the present invention, as a metallocene compound (b) a compound represented by the following formula (3) can be also employed as the metallocene compound.

$$L^1M^2Z^1{}_2 \qquad (3)$$

wherein, $M^2$ is a metal of Group 4 of the periodic table or a metal of lanthanide series;

$L^1$ is a derivative of delocalization a bond group and imparts restraint geometrical shape to the metal $M^2$ active site; and the $Z^1$'s are each independently hydrogen, halogen or a hydrocarbon group, a silyl group or a germyl group respectively containing 20 or less carbon, silicon or germanium atoms.

Of the metallocene compounds (b) of the formula (3), preferred are compounds represented by the following formula (4).

In the formula (4), $M^3$ represents titanium, zirconium or hafnium, and $Z^1$ is as defined above.

Cp represents an unsubstituted or a substituted cyclopentadienyl group or a derivative thereof, which is π-bonded in $\eta^5$ bonding form to $M^3$.

$W^1$ represents oxygen, sulfur, boron, an element of Group 14 of the periodic table or a group containing any of these elements.

$V^1$ represents a ligand containing nitrogen, phosphorus, oxygen or sulfur.

$W^1$ and $V^1$ may form a condensed ring, and Cp and $W^1$ may form a condensed ring.

Preferred examples of groups represented by Cp of the general formula (4) include a cyclopentadienyl group, an indenyl group, a fluorenyl group and saturated derivatives thereof. These form rings in cooperation with metal atom ($M^3$). Each carbon atom in the cyclopentadienyl radical may be substituted or unsubstituted with the same or a different radical selected from the group consisting of hydrocarbyl radicals, substituted-hydrocarbyl radicals wherein one or more hydrogen atoms is replaced by a halogen atom, hydrocarbyl-substituted metalloid radicals wherein the metalloid is selected from Group 14 of the Periodic Table of the Elements, and halogen radicals. In addition two or more such substituents may together form a fused ring system. Suitable hydrocarbyl and substituted-hydrocarbyl radicals, which may be substituted for at least one hydrogen atom in the cyclopentadienyl radical, will contain from 1 to 20 carbon atoms and include straight and branched alkyl radicals, cyclic hydrocarbon radicals, alkyl-substituted cyclic hydrocarbon radicals, aromatic radicals and alkyl-substituted aromatic radicals. Suitable organometalloid radicals include mono-, di- and trisubstituted organometalloid radicals of Group 14 elements wherein each of the hydrocarbyl groups contain from 1 to 20 carbon atoms. More particularly, suitable organometalloid radicals include trimethylsilyl, triethylsilyl, ethyldimethylsilyl, methyldiethylsilyl, phenyldimethylsilyl, methyldiphenylsilyl, triphenylsilyl, triphenylgermyl, trimethylgermyl and the like.

$Z^1$s of the general formula (4) each represent, for example, a hydride, a halo, an alkyl, a silyl, a germyl, an aryl, an amide, an aryloxy, an alkoxy, a phosphide, a sulfide, an acyl, a pseudohalide such as a cyanide or an azide, an acetylacetonate or a mixture thereof, which may be either identical with or different from each other.

Among the various metallocene compounds (b), the metallocene compound represented by the general formula (3) is especially preferred from the viewpoint of polymerization activity and the transparency, rigidity, heat resistance and impact resistance of molded item. The above described metallocene compounds (b) may be used either individually or in combination.

Each of the metallocene compounds (b) for use in the present invention may be diluted with a hydrocarbon or a halogenated hydrocarbon prior to use.

The organoaluminum oxy compound (c) and ionizing ionic compound (d) for use in the formation of the metallocene catalyst (a) will be described below.

The organoaluminum oxy compound (c) for use in the present invention may be conventional aluminoxane (c) or benzene-insoluble organoaluminum oxy compounds (c) exemplified in Japanese Patent Laid-open Publication No. 2(1990)-78687.

The aluminoxane (c) is produced, for example, by the following methods and is generally recovered as a solution in a hydrocarbon solvent:

method (1) in which an organoaluminum compound such as a trialkylaluminum is added to an aromatic hydrocarbon solvent suspended with an adsorbed water containing compound or crystal water containing salt such as magnesium chloride hydrate, copper sulfate hydrate, aluminum sulfate hydrate, nickel sulfate hydrate or cerium (I) chloride hydrate and reacted, and the product is recovered as a solution in an aromatic hydrocarbon solvent;

method (2) in which water (liquid water, ice or steam) directly acts on an organoaluminum compound such as a trialkylaluminum in a solvent such as benzene, toluene, ethyl ether or tetrahydrofuran, and the product is recovered as a solution in an aromatic hydrocarbon solvent; and method (3) in which an organotin oxide such as dimethyltin oxide or dibutyltin oxide reacts with an organoaluminum compound such as a trialkylaluminum in a hydrocarbon solvent such as decane, benzene or toluene.

Examples of suitable ionizing ionic compounds (d) include Lewis acids, ionic compounds, borane compounds and carborane compounds. These ionizing ionic compounds (d) are described in Published Japanese Translation of PCT international publication for Patent Application, Nos. 1(1989)-501950 and 1(1989)-502036, Japanese Patent Laid-open Publication Nos. 3(1991)-179005, 3(1991)-179006, 3(1991)-207703 and 3(1991)-207704 and U.S. Pat. No. 5,321,106.

The Lewis acid used as ionizing ionic compound (d) is, for example, any of compounds represented by the formula $BR_3$ (wherein Rs may be identical with or different from each other and represent fluorine atoms or phenyl groups unsubstituted or substituted with a fluorine atom, a methyl group, a trifluoromethyl group or the like).

Examples of suitable Lewis acids include trifluoroboron, triphenylboron, tris(4-fluorophenyl)boron, tris(3,5-difluorophenyl)boron, tris(4-fluoromethylphenyl)boron and tris(pentafluorophenyl)boron.

The ionic compound used as ionizing ionic compound (d) is a salt composed of a cationic compound and an anionic compound. The anionic compound reacts with the above metallocene compound (b) to thereby cationize the metallocene compound (b) and thus form an ion pair to stabilize transition metal cation species. Examples of suitable anions include organoboron compound anions, organoarsenic compound anions and organoaluminum compound anions. Of these, relatively bulky anions capable of stabilizing transition metal cation species are preferred. Examples of suitable cations include metal cations, organometal cations, carbonium cations, tritium cations, oxonium cations, sulfonium cations, phosphonium cations and ammonium cations. Specifically, suitable cations include triphenylcarbenium cation, tributylammonium cation, N,N-dimethylanmonium cation and ferrocenium cation.

Of the above compounds, ionic compounds containing a boron compound are preferably used as the anionic compound, which include, for example, trialkylsubstituted ammonium salts, N,N-dialkylanilinium salts, dialkylammonium salts and triarylphosphonium salts.

Examples of the above trialkyl-substituted ammonium salts include triethylammonium tetra(phenyl)boron, tripropylammonium tetra(phenyl)boron, tri(n-butyl)ammonium tetra(phenyl)boron and trimethylammonium tetra(p-tolyl) boron.

Examples of the above N,N-dialkylanilinium salts include N,N-dimethylanilinium tetra(phenyl)boron.

Examples of the above dialkylammonium salts include di(n-propyl)ammonium tetra(pentafluorophenyl)boron and dicyclohexylammonium tetra(phenyl)boron.

Examples of the above triarylphosphonium salts include triphenylphosphonium tetra(phenyl)boron, tri(methylphenyl)phosphonium tetra(phenyl)boron, and tri(dimethylphenyl)phosphonium tetra(phenyl)boron.

Moreover, triphenylcarbenium tetrakis(pentafluorophenyl) borate, N,N-dimethylanilinium tetrakis (pentafluorophenyl) borate, ferrocenium tetra (pentafluorophenyl) borate and the like can be mentioned as the above ionic compounds.

Examples of the borane compounds used as ionizing ionic compound (d) include:

decaborane (14);

anion salts such as bis[tri(n-butyl)ammonium] nonaborate and bis[tri(n-butyl)ammonium] decaborate; and metal borane anion salts such as tri(n-butyl)ammonium bis(dodecahydridedodecaborate) cobalt acid salt (III) and bis[tri(n-butyl)ammonium] bis (dodecahydridedodecaborate) nickel acid salt (III).

Examples of the carborane compounds used as ionizing ionic compound (d) include:

anion salts such as 4-carbanonaborane (14) and 1,3-dicarbanonaborane (13); and metal carborane anion salts such as tri(n-butyl) ammonium bis(nonahydride-1,3-dicarbanonaborate) cobalt acid salt (III) and tri(n-butyl)ammonium bis (undecahydride-7,8-dicarbaundecaborate) iron acid salt (III).

The above ionizing ionic compounds (d) may be used in combination.

The metallocene catalyst (a) for use in the present invention may contain the following organoaluminum compound (e) in addition to the above components, according to necessity.

The organoaluminum compound (e) employed according to necessity is, for example, the organoaluminum compound represented by the general formula:

$$(R^6)_n AlX_{3-n} \quad (5)$$

In the formula (5), $R^6$ represents a hydrocarbon group having 1 to 15, preferably, 1 to 4 carbon atoms; X represents a halogen atom or a hydrogen atom; and n is 1 to 3.

Examples of suitable hydrocarbon groups each having 1 to 15 carbon atoms include alkyl groups, cycloalkyl groups and aryl groups. Specifically, use is made of, for example, a methyl, an ethyl, a n-propyl, an isopropyl or an isobutyl group.

Examples of suitable organoaluminum compounds include: trialkylaluminums such as trimethylaluminum, triethylaluminum, triisopropylaluminum, tri-n-butylaluminum, triisobutylaluminum and tri-sec-butylaluminum;

alkenylaluminums such as isoprenylaluminum, represented by the general formula:

$$(i-C_4H_9)_x Al_y (C_5H_{10})_z$$

wherein x, y and z are positive numbers, and z and x satisfy the relationship $z \geq 2x$;

dialkylaluminum halides such as dimethylaluminum chloride and diisobutylaluminum chloride;

dialkylaluminum hydrides such as diisobutylaluminum hydride;

dialkylaluminum alkoxides such as dimethylaluminum methoxide; and dialkylaluminum aryloxides such as diethylaluminum phenoxide.

The copolymerization of ethylene and the aromatic vinyl compound optionally together with the α-olefin having 3 to 20 carbon atoms may be conducted by either the batch process or the continuous process. When the copolymerization is conducted by the continuous process, the metallocene catalyst (a) is used in the following concentration.

That is, the concentration of metallocene compound (b) in the polymerization system generally ranges from 0.00005 to 1.0 mmol/lit., preferably, 0.0001 to 0.5 mmol/lit. (polymerization volume).

The organoaluminum oxy compound (c) is fed in an amount of 0.1 to 10,000, preferably, 1 to 5000 in terms of the ratio of aluminum atoms to metallocene compound (b) (Al/transition metal) in the polymerization system.

The ionizing ionic compound (d) is fed in an amount of 0.1 to 20, preferably, 1 to 10 in terms of the molar ratio of ionizing ionic compound (d) to metallocene compound (b) in the polymerization system (ionizing ionic compound (d)/metallocene compound (b)).

When the organoaluminum compound (e) is used, it is generally fed in an amount of about 0 to 5 mmol/lit., preferably, about 0 to 2 mmol/lit. (polymerization volume).

The copolymerization reaction for producing the α-olefin/aromatic vinyl compound random copolymer is generally conducted at a temperature of −30 to 250° C., preferably, 0 to 200° C. under a pressure of more than 0 and up to 80 kg/cm², preferably, more than 0 and up to 50 kg/cm² (gauge pressure).

Although depending on the catalyst concentration, polymerization temperature and other conditions, the reaction time (average residence time when the copolymerization is carried out by the continuous process) generally ranges from 5 min to 3 hr, preferably, from 10 min to 1.5 hr.

In the production of the α-olefin/aromatic vinyl compound random copolymer, ethylene and the aromatic vinyl compound optionally together with the α-olefin having 3 to 20 carbon atoms are fed to the polymerization system in such amounts that the copolymer with the above specified compositions can be obtained. Further, a molecular weight regulator such as hydrogen can be employed in the copolymerization.

When ethylene and the aromatic vinyl compound optionally together with the α-olefin having 3 to 20 carbon atoms are copolymerized in the above manner, the α-olefin/aromatic vinyl compound random copolymer is obtained as a polymer solution containing the same. The polymer solution is treated according to the customary procedure. Thus, there is obtained the α-olefin/aromatic vinyl compound random copolymer.

Although the olefin copolymer shrink film of the present invention can be formed from the above α-olefin/aromatic vinyl compound random copolymer, it may contain an adhesive resin (tackifier) in addition to the random copolymer.

Examples of the adhesive resins (tackifier) for use in the present invention include rosin, modified rosin, coumarone-indene resin, hydrocarbon resins, terpene resins and polyester resins.

Examples of the hydrocarbon resins for use in the present invention include:

resins obtained by polymerizing in the presence of Friedel-Crafts catalyst any arbitrary fraction formed by thermal cracking of petroleum and having a boiling point of −10 to 280° C. at atmospheric pressure;

resins obtained by copolymerizing in the same manner the above fraction with up to 50% by weight of a cationically polymerizable pure monomer, for example, an unsaturated aliphatic compound such as isobutylene, butadiene, isoprene or piperylene, an unsaturated alicyclic compound such as dicyclopentadiene, or an unsaturated aromatic compound such as styrene, vinyltoluene, isopropenyltoluene, α-methylstyrene or indene, resins obtained by a cationic polymerization or radical polymerization of only the above unsaturated aromatic compound; and resins obtained by hydrogenating the above resins. Of these, resin known as aliphatic petroleum resin which is obtained by polymerizing in the presence of Friedel-Crafts catalyst a fraction formed by thermal cracking of petroleum and having a boiling point of −10 to 60° C. at atmospheric pressure is preferred from the viewpoint that excellent heat resistance and hue can be attained.

The hydrocarbon resins obtained by the above methods are solid at room temperature; have a number average molecular weight of 500 to 3000, preferably, 700 to 2000; have Ring and Ball softening point of 60 to 150° C., preferably, 70 to 120° C.; and exhibits a hue (Gardner, resin 100%) of 10 or less, preferably, 8 or less.

In the present invention, it is preferred that the above hydrocarbon resin be used in an amount of 1 to 50 parts by weight, preferably, 3 to 20 parts by weight per 100 parts by weight of the α-olefin/aromatic vinyl compound random copolymer. The blending of this hydrocarbon resin improves the low-temperature shrinkability. However, when the amount thereof is too large, deteriorations of the mechanical strength and transparency of the film may be encountered.

Fillers can be blended into the α-olefin/aromatic vinyl compound random copolymer in order to improve the appearance and slipping and antiblocking properties thereof. Examples of the fillers for use in the present invention include precipitated calcium carbonate light, calcium carbonate heavy, basic calcium carbonate, aluminum hydroxide, magnesium hydroxide, magnesium oxide, kaolin, clay, pyrophillite, sericite, talc, calcium silicate (wollastonite, xonotlite or petalous calcium silicate), diatom earth, aluminum silicate, silicic anhydride, hydrous silicic acid, magnesium silicate, silica, alumina, barium sulfate, aluminum sulfate, calcium sulfate, magnesium sulfate, molybdenum disulfide and graphite. These fillers can be used in appropriate amounts.

Moreover, according to necessity, the α-olefin/aromatic vinyl compound random copolymer may be blended with another thermoplastic resin, a thermal stabilizer, a weather stabilizer, a softening agent, a pigment, a plasticizer, a flame retarder, a lubricant, an antistatic agent and an electrical property improver in amounts not detrimental to the properties of the random copolymer.

The shrink wrapping film of the present invention can be obtained from the above α-olefin/aromatic vinyl compound random copolymer by melt forming the random copolymer into a film and uniaxially or biaxially orienting the film. The film formation can be conducted by any of the common methods such as the inflation method, the T-die method and the calender method. For exa mple, the orientation of the film can be conducted by the inflating simultaneous biaxially orienting method, the flat serial biaxially orienting method based on a combination of, for example, a roll orienting machine and a tenter orienting machine or the flat simultaneous biaxially orienting method. It is preferred that the resin temperature be maintained at 130 to 290° C., especially, 150 to 260° C. during the film formation. The selection of orientation temperature is important for the shrink wrapping film of the present invention. That is, the lower the orientation temperature, the more desirable the low-temperature shrinkability of resultant film. However, employing too low orientation temperatures would invite breakage at the film orientation and deterioration of the film transparency. On the other hand, orienting at temperatures close to the melting point of the α-olefin/aromatic vinyl compound random copolymer is also unfavorable because of deteriorations of the film transparency, gloss and low-temperature shrinkability. Thus, preferred orientation temperature depends on the type of orienting method, and, in the tenter simultaneous biaxially orienting method, it is in the range of the melting point of the α-olefin/aromatic vinyl compound random copolymer minus 40° C. to the melting point minus 3° C., preferably, the melting point minus 30° C. to the melting point minus 5° C. In the inflating simultaneous biaxially orienting method, it is preferred that the orientation be conducted at temperatures which are 5 to 10° C. lower than the above temperature.

Draw ratio also depends on the type of orienting method, and it preferably ranges from about 1.5 to 4 in the inflating biaxially orienting method and preferably ranges from about 3 to 10 in the flat biaxially orienting method. In the simultaneous biaxially orienting method, it is preferred that the draw ratios along the longitudinal axis be identical with each other from the viewpoint that uniform shrink properties can be attained.

EFFECT OF THE INVENTION

The olefin copolymer shrink film of the present invention has excellent transparency and low temperature shrinkability.

EXAMPLE

The present invention will now be further illustrated with reference to the following Examples, which in no way limit the scope of the invention.

Production Example 1

Production of Ethylene/styrene Random Copolymer

A 1 lit. glass reactor equipped with a condenser and an agitator was satisfactorily purged with nitrogen, charged with 487 ml of toluene and 13 ml of styrene and filled with ethylene under agitation. Subsequently, the system interior was heated to 35° C., and 4.5 mM of methylaluminoxane (produced by Tosoh Akzo, 10% by weight toluene solution) and 0.045 mM of (t-butylamido)dimethyl(tetramethyl-$\eta^5$-cyclopentadienyl)silane titanium dichloride (0.01 mM toluene solution) were added to the mixture. A polymerization was conducted at 40° C. for 60 min while continuously feeding ethylene at a rate of 100 Nlit./hr.

After the completion of the polymerization, 250 ml of isobutyl alcohol and 10 ml of aqueous hydrochloric acid were added to the mixture and heated at 80° C. for 30 min under agitation. The obtained reaction mixture containing isobutyl alcohol was transferred to a separating funnel, washed with 250 ml of water twice and separated into an oil phase and a water phase. The oil phase was poured into 3 lit. of methanol to thereby precipitate a polymer. The precipitated and separated polymer was dried in vacuum at 130° C. for 12 hr, thereby obtaining 20 g of a polymer having an ethylene content of 93.5 mol % and a styrene content of 6.5 mol % (copolymer (a)). This copolymer (a) exhibited an intrinsic viscosity [η] of 1.4 dl/g which was measured in 135° C. decalin and a melting point (Tm) of 83° C. which was measured by a differential scanning calorimeter.

Production Example 2

Production of Ethylene/1-octene/styrene Random Copolymer

A 2 lit. autoclave was satisfactorily purged with nitrogen and charged with 430 ml of toluene, 163 ml of styrene and 7 ml of 1-octene. Subsequently, ethylene was introduced to to be a pressure of 16 kg/cm$^2$ while heating the system interior to 90° C. under agitation. Thereafter, 5.0 mM of methylaluminoxane (produced by Tosoh Akzo, 3% by weight toluene solution) and 0.005 mM of (t-butylamido) dimethyl(tetramethyl-$\eta^5$-cyclopentadienyl)silane titanium dichloride synthesized by the conventional process were placed in a separate reactor and agitated for 20 min. The mixture was introduced into the autoclave, and a polymerization was initiated. The polymerization was performed for 30 min while continuously feeding ethylene so that the ethylene pressure was maintained at 16 kg/cm$^2$ during the polymerization. The polymerization was terminated by adding 5 ml of methanol.

After the completion of the polymerization, a polymer was precipitated by pouring the polymerization solution into 1 lit. of methanol. The precipitated polymer was washed with 1 lit. of methanol twice and dried in vacuum at 130° C. for 12 hr, thereby obtaining 35 g of a polymer having an ethylene content of 94.6 mol %, a 1-octene content of 0.7 mol % and a styrene content of 4.7 mol % (copolymer (b)). This copolymer (b) exhibited an intrinsic viscosity [$\eta$] of 1.8 dl/g which was measured in 135° C. decalin and a melting point (Tm) of 93° C. which was measured by a differential scanning calorimeter.

Production Example 3

Production of Ethylene/1-octene/styrene Random Copolymer

A 2 lit. autoclave was satisfactorily purged with nitrogen and charged with 400 ml of toluene, 170 ml of styrene and 30 ml of 1-octene. Subsequently, ethylene was introduced to to be a pressure of 16 kg/cm$^2$ while heating the system interior to 90° C. under agitation. Thereafter, 5.0 mM of methylaluminoxane (produced by Tosoh Akzo, 3% by weight toluene solution) and 0.005 mM of (t-butylamido) dimethyl(tetramethyl-$\eta^5$-cyclopentadienyl)silane titanium dichloride synthesized by the conventional process were placed in a separate reactor and agitated for 20 min. The mixture was introduced into the autoclave, and a polymerization was initiated. The polymerization was performed for 30 min while continuously feeding ethylene so that the ethylene pressure was maintained at 16 kg/cm$^2$ during the polymerization. The polymerization was terminated by adding 5 ml of methanol.

After the completion of the polymerization, a polymer was precipitated by pouring the polymerization solution into 1 lit. of methanol. The precipitated polymer was washed with 1 lit. of methanol twice and dried in vacuum at 130° C. for 12 hr, thereby obtaining 30 g of a polymer having an ethylene content of 92.8 mol %, a 1-octene content of 2.6 mol % and a styrene content of 4.6 mol % (copolymer (c)). This copolymer (c) exhibited an intrinsic viscosity [$\eta$] of 1.2 dl/g which was measured in 135° C. decalin and a melting point (Tm) of 82° C. which was measured by a differential scanning calorimeter.

Production Example 4

Production of Ethylene/styrene Random Copolymer

A 1 lit. glass reactor equipped with a condenser and an agitator was satisfactorily purged with nitrogen, charged with 476 ml of toluene and 24 ml of styrene and filled with ethylene under agitation. Subsequently, the system interior was heated to 35° C., and 4.5 mM of methylaluminoxane (produced by Tosoh Akzo, 10% by weight toluene solution) and 0.045 mM of (t-butylamido)dimethyl(tetramethyl-$\eta^5$-cyclopentadienyl)silane titanium dichloride (0.01 mM toluene solution) were added to the mixture. A polymerization was conducted at 40° C. for 60 min while continuously feeding ethylene at a rate of 100 Nlit./hr.

After the completion of the polymerization, 250 ml of isobutyl alcohol and 10 ml of aqueous hydrochloric acid were added to the mixture and heated at 80° C. for 30 min under agitation. The obtained reaction mixture containing isobutyl alcohol was transferred to a separating funnel, washed with 250 ml of water twice and separated into an oil phase and a water phase. The oil phase was poured into 3 lit. of methanol to thereby precipitate a polymer. The precipitated and separated polymer was dried in vacuum at 130° C. for 12 hr, thereby obtaining 20 g of a polymer having an ethylene content of 86.5 mol % and a styrene content of 13.5 mol % (copolymer (d)). This copolymer (d) exhibited an intrinsic viscosity [$\eta$] of 1.1 dl/g which was measured in 135° C. decalin and a melting point (Tm) of 53° C. which was measured by a differential scanning calorimeter.

Production Example 5

Production of Ethylene/styrene Random Copolymer 23 g of an ethylene/styren e random copolymer having an ethylene content of 91 mol % and a styrene content of 9 mol % (e) was obtained in the same manner as in Produc tion Example 1 except that isopropylidenebis(indenyl)zirconium dichloride synthesized by the conventional process was used in place of (t-butylamido) dimethyl (tetramethyl-$\eta^5$-cyclopentadienyl)silane titanium dichloride. This copolymer (e) exhibited an intrinsic viscosity [$\eta$] of 1.1 dl/g which was measured in 135° C. decalin and a melting point (Tm) of 81° C. which was measured by a differential scanning calorimeter.

Example 1

5 parts by weight of adhesive resin (trade name: Escorez, produced by Tonex), 0.1 p art by weight of calcium stearate as a stabilizer, 0.1 part by w eight of Irganox 1010 (trade name, produced by Ciba-Geigy) and 0.1 part by weight of Irganox 168 (trade name, produced by Ciba-Geigy) were added to 95 parts by weight of the copolymer (a) produced in Production Example 1 and blended by means of a laboplastomill at 60 rpm at 200° C. for 5 min.

The thus obtained composi tion was press mol ded at 190° C. into a raw film of 0.1 mm thickness. A test piece of 100 mm length and 20 mm width was cut out therefrom. The test piece was uniaxially oriented at an orientation temperature of 70° C. and a draw ratio of 4, maintained at that state for 1 min and cooled. The thermal shrinkage factor and haze of obtained specimen were measured in the following manners. The results are given in Table 1.

Thermal Shrinkage Factor

Specimen of 40 mm length and 6 mm width was immersed in an 80° C. water for 5 sec. After the immersion, the length (L) of the specimen was measured, and the thermal shrinkage factor was calculated by the formula:

thermal shrinkage factor (%) =(1−(L/40))×100.

Haze

The haze of the specimen was measured by the use of digital haze meter NDH-20D manufactured by Nippon Denshoku Kogyo Co., Ltd. in accordance with ASTM D1003-52.

Example 2

The same procedure as in Example 1 was repeated except that the copolymer (b) produced in Production Example 2 was used in place of the copolymer (a). The results are given in Table 1.

Example 3

The same procedure as in Example 1 was repeated except that the copolymer (c) produced in Production Example 3 was used in place of the copolymer (a). The results are given in Table 1.

Example 4

The same procedure as in Example 1 was repeated except that 100 parts by weight of the copolymer (a) was used without the use of the adhesive resin. The results are given in Table 1.

Example 5

The same procedure as in Example 1 was repeated except that the ethylene/styrene random copolymer (e) produced in Production Example 5 was used in place of the copolymer (a). The results are given in Table 1.

Comparative Example 1

The same procedure as in Example 1 was repeated except that the copolymer (d) produced in Production Example 4 was used in place of the copolymer (a). The results are given in Table 1.

TABLE 1

|  | Ex. 1 | Ex. 2 | Ex. 3 | Ex. 4 | Ex. 5 | Comp. Ex. 1 |
|---|---|---|---|---|---|---|
| Copolymer (a) | 95 | — | — | 100 | — | — |
| Copolymer (b) | — | 95 | — | — | — | — |
| Copolymer (c) | — | — | 95 | — | — | — |
| Copolymer (d) | — | — | — | — | — | 95 |
| Copolymer (e) | — | — | — | — | 95 | — |
| Adhesive resin | 5 | 5 | 5 | — | 5 | 5 |
| Thermal shrinkage factor (%) | 28 | 29 | 28 | 32 | 29 | 3 |
| Haze (%) | 1.6 | 1.8 | 1.4 | 1.5 | 1.9 | 1.2 |

What is claimed is:

1. An olefin copolymer shrink film comprising an α-olefin/aromatic vinyl compound random copolymer and a tackifier, said α-olefin/aromatic vinyl compound random copolymer comprising as polymerized structural units:
   99.9 to 58 mol % ethylene,
   0 to 30 mol % α-olefin having 3 to 20 carbon atoms provided that the total of said ethylene structural units and said α-olefin structural units of an α-olefin having 3 to 20 carbon atoms ranges from 99.9 to 88 mol %, and
   0.1 to 12 mol % aromatic vinyl compound;
   said α-olefin/aromatic vinyl compound random copolymer having an intrinsic viscosity (η), as measured in decalin at 135° C., of 0.1 to 10 dl/g and having a melting point, as measured by a differential scanning calorimeter, of 60 to 125° C.,
   wherein the tackifier is blended in an amount of 1 to 50 parts by weight per 100 parts by weight of the α-olefin/aromatic vinyl compound random copolymer, and
   said olefin copolymer shrink film being oriented in at least one direction.

2. The olefin copolymer shrink film as claimed in claim 1, which is oriented biaxially.

3. The olefin copolymer shrink film as claimed in claim 1, which has a thermal shrinkage factor of at least 20% at 80° C.

4. An olefin copolymer shrink film comprising an α-olefin/aromatic vinyl compound random copolymer and a tackifier, said α-olefin/aromatic vinyl compound random copolymer comprising as polymerized structural units:
   99.85 to 80 mol % ethylene,
   0.5 to 10 mol % α-olefin having 3 to 20 carbon atoms provided that the total of said structural ethylene units and said α-olefin structural units of an α-olefin having 3 to 20 carbon atoms ranges from 99.9 to 88 mol %, and
   1 to 10 mol % aromatic vinyl compound;
   said α-olefin/aromatic vinyl compound random copolymer having an intrinsic viscosity (η), as measured in decalin at 135° C., of 0.1 to 10 dl/g and having a melting point, as measured by a differential scanning calorimeter, of 60 to 125° C.,
   wherein the tackifier is blended in an amount of 3 to 20 parts by weight per 100 parts by weight of the α-olefin/aromatic vinyl compound random copolymer, and
   said olefin copolymer shrink film being oriented in at least one direction.

5. The olefin copolymer shrink film as claimed in claim 4, which is oriented biaxially.

6. The olefin copolymer shrink film as claimed in claim 4, which has a thermal shrinkage factor of at least 20% at 80° C.

7. An ethylene copolymer shrink film comprising an ethylene/aromatic vinyl compound random copolymer and a tackifier, said ethylene/aromatic vinyl compound random copolymer comprising as polymerized structural units:
   99 to 90 mol % ethylene, and
   1 to 10 mol % aromatic vinyl compound;
   said ethylene/aromatic vinyl compound random copolymer having an intrinsic viscosity (η), as measured in decalin at 135° C., of 0.1 to 10 dl/g and having a melting point, as measured by a differential scanning calorimeter, of 60 to 125° C.,
   wherein the tackifier is blended in an amount of 3 to 20 parts by weight per 100 parts by weight of the ethylene/aromatic vinyl compound random copolymer, and
   said olefin copolymer shrink film being oriented in at least one direction.

8. The ethylene copolymer shrink film as claimed in claim 7, which is oriented biaxially.

9. The ethylene copolymer shrink film as claimed in claim 8, which has a thermal shrinkage factor of at least 20% at 80° C.

10. The olefin copolymer shrink film of claim 1, 4 or 7 wherein the aromatic vinyl compound is a member selected from the group consisting of styrene and 4-methoxystyrene.

11. The olefin copolymer shrink film of claim 1 or 4 wherein the α-olefin is a member selected from the group consisting of 1-hexene and 1-octene.

* * * * *